(12) United States Patent
Berner et al.

(10) Patent No.: US 10,712,217 B2
(45) Date of Patent: Jul. 14, 2020

(54) STATOR FASTENING IN TORQUE SENSOR

(71) Applicant: Bourns, Inc., Riverside, CA (US)

(72) Inventors: Sebastian Berner, Munich (DE); Miguel Cano, Munich (DE); Hans Schmotz, Aying (DE)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 15/987,382

(22) Filed: May 23, 2018

(65) Prior Publication Data

US 2018/0339729 A1    Nov. 29, 2018

(30) Foreign Application Priority Data

May 23, 2017   (DE) .................... 10 2017 111 305
Aug. 14, 2017  (DE) .................... 10 2017 118 456

(51) Int. Cl.

| G01L 5/22 | (2006.01) |
| G01L 3/10 | (2006.01) |
| B62D 6/10 | (2006.01) |
| B62D 15/02 | (2006.01) |
| B62D 5/04 | (2006.01) |

(52) U.S. Cl.
CPC ............... G01L 5/221 (2013.01); B62D 6/10 (2013.01); B62D 15/0215 (2013.01); G01L 3/101 (2013.01); G01L 3/104 (2013.01); B62D 5/0409 (2013.01); B62D 5/0481 (2013.01)

(58) Field of Classification Search
CPC ....... B62D 6/10; B62D 15/0215; G01L 3/101; G01L 3/104; G01L 5/221
USPC ........................................ 310/263
See application file for complete search history.

(56) References Cited

U.S. PATENT DOCUMENTS

2004/0194560 A1* 10/2004 Froehlich ............... G01L 3/104
                                                          73/862.333
2007/0295109 A1   12/2007 Tokumoto et al.

FOREIGN PATENT DOCUMENTS

DE         102012024383 A1 *  6/2014  ............... G01L 3/10

* cited by examiner

*Primary Examiner* — Terrance L Kenerly
(74) *Attorney, Agent, or Firm* — Michael Best & Friedrich LLP

(57) ABSTRACT

A stator to guide a location-dependent magnetic field around a rotation axis including a first stator ring and a second stator ring arranged concentrically to the first stator ring. First claws project axially from the first stator ring in the direction of the second stator ring and are arranged circumferentially around a rotation axis and at a distance with the first claw gaps engaging in second claw gaps between second claws which are arranged circumferentially around the rotation axis, and protrude axially in the direction of the first stator ring at a distance to the second claw gaps. Each of the first and second claws includes a claw head. In at least one of the first claw gaps and in one of the second claw gaps relative to the corresponding claw head, a stator fastening element is arranged to fasten the first and second stator rings.

8 Claims, 5 Drawing Sheets

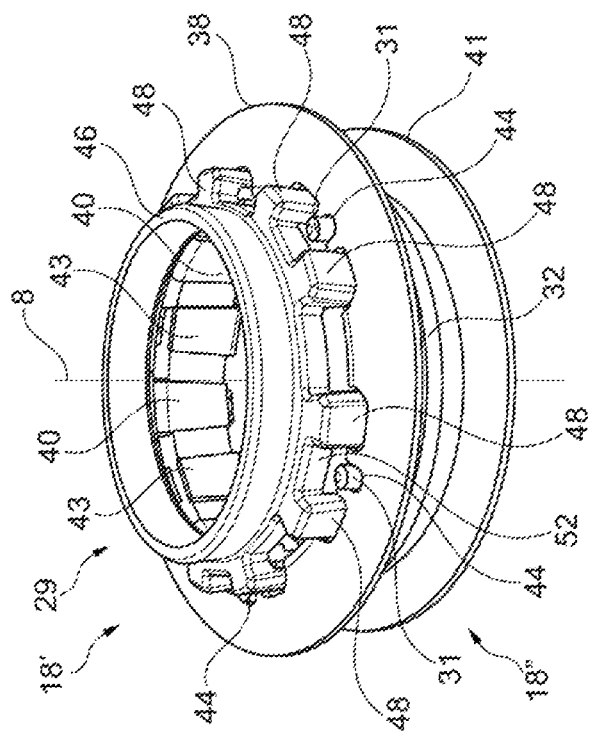
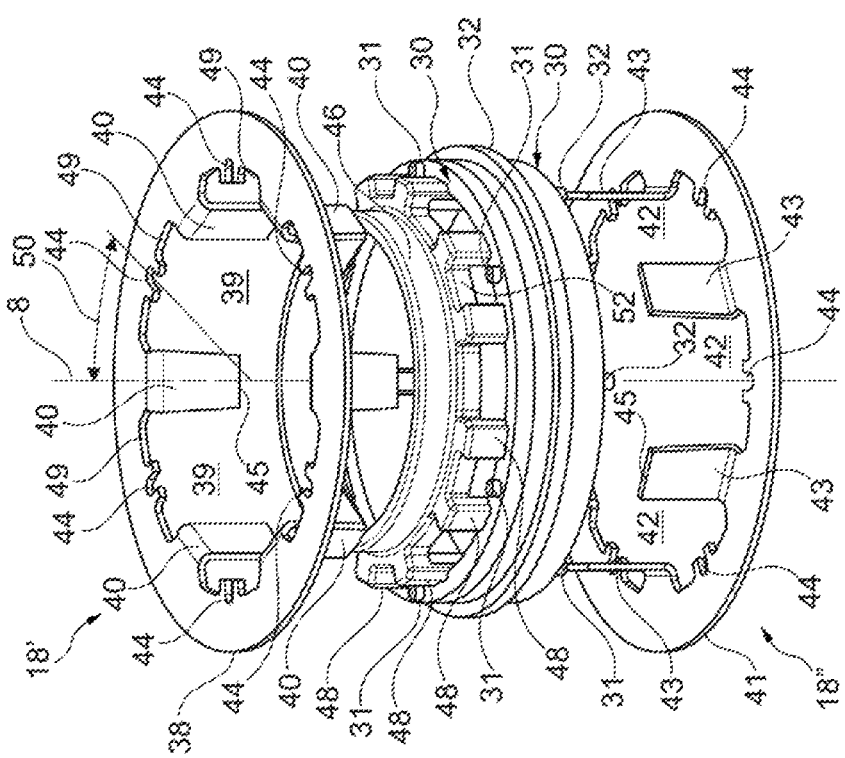

STATOR FASTENING IN TORQUE SENSOR

FIELD

The present invention relates to a stator to guide a location-dependent magnetic field around a rotation axis in a circumferential direction.

A known stator is disclosed in EP 1 870 684 B1.

The invention has the task of improving the stator.

According to the invention, a stator fastening element is arranged in a stator in at least one of the first claw gaps and in one of the second claw gaps relative to the corresponding claw head engaging in the respective first and second claw gap for mounting the first and second stator ring on a carrier.

The stator is based on the idea that known stators comprise fastening elements in the shape of through-bores on the stator ring. In known stators, it is therefore not possible to arrange collector sheets which conduct a magnetic flux through the stator rings to a measuring sensor. For this reason, flux collectors are arranged circumferentially on the radial outside of known stators. This arrangement, however, is not optimal regarding electromagnetic interferences because a magnetic field from an external interfering magnetic source can reach the flux collectors unimpeded, thus bringing in an interfering magnetic field.

If the stator rings were used as electromagnetic shields and the flux collectors were arranged axially between the stator rings, external magnetic interferences could at least be dampened. However, this is not possible with known stators because the fastening element will interfere with the stator.

SUMMARY

For this reason, the fastening elements of the one embodiment are arranged in the claw gaps on the radial inner side of the stator rings. In this way, the flux collectors can be arranged interference-free axially between the stator rings.

In an embodiment of the said stator, the stator fastening element is a stator interlocking element acting in circumferential direction, in which a carrier interlocking element arranged on the carrier may engage axially. In this way, the stator may be easily positioned and mounted on the carrier.

In an additional embodiment of the said stator, the stator interlocking element is a yoke radially pointing to the rotation axis. This is open on a radial inner side of the stator, so that no magnetic conducting material in an excitation magnet of the sensor may interfere with the stator and cause undesirable magnetic short circuits.

In a further embodiment of the said stator, the yoke is executed as one piece with the respective stator ring. In this way, the said stator can be produced in a simple way by efficient manufacturing processes, such as primary forming or cutting, without the need to subsequently mount the fastening elements on the stator ring.

In another embodiment of the said stator, the stator fastening element is arranged in a radial gap between two adjacent claws. In this way, the fastening element may be arranged radially on a level with the claws, so that on the one hand the entire assembly space is used to mount the stator on the carrier, and the claws can be brought radially close to the excitation magnet, on the other hand, the short-circuits mentioned above are avoided efficiently because the stator fastening elements do not protrude radially above the claws.

In a special embodiment of the said stator, the stator fastening element is arranged in the centre of the radial gap between the two adjacent claws. In this way, the stator fastening element is received axisymmetrically in the gap when viewed in circumferential direction, and is always equally loaded regardless of a direction of rotation of the sensor with the stator element.

In a preferred embodiment of the said stator, the stator ring is a punched part, on which the claws are bent axially. In this way, the individual stator rings can be produced as a sheet pack, from which the individual claws only have to be bent, for example, by deep drawing.

In accordance with a further aspect of the invention, to record a torque between a first shaft and a second shaft being connected with each other via a torsion bar, a sensor comprises a cylindrical carrier with two opposite front sides, each one provided with a carrier fastening element, an abovementioned stator which can be connected stationarily with the first shaft, whose stator rings are positioned on the front sides of the carrier and mounted on the carrier via the respective carrier fastening elements and stator fastening elements, a magnetic transducer which can be connected stationarily with the second shaft, and which is arranged co-axially to the rotation axis to generate and feed the magnetic field in the stator, and a magnetic field sensor for recording a magnetic field from the magnetic transducer passing the stator.

In an embodiment of the said stator, the carrier fastening elements are spigots which are stalked with the stator fastening elements. The stalking process makes it possible to easily connect the carrier and the stator with each other.

In another embodiment, one of the front sides of the carrier is equipped with connecting columns carrying an attachment element on the carrier for the first shaft. These columns are stable enough to ensure sufficient mechanical strength when the sensor turns, and simultaneously allow for the two shafts to be axially disconnected to receive the sensor components.

The properties, features and benefits of the invention described above, as well as the manner in which they are achieved, will be made clearer in connection with the following description of the embodiment examples, which are described in more detail in connection with the drawing. The following is shown:

BRIEF DESCRIPTION OF THE DRAWINGS

FIG. 2b schematic perspective cross-sectional view of a torque sensor from FIG. 2a.

FIGS. 3a-3c illustrate schematic perspective views of a stator from the torque sensor of FIGS. 2a and 2b.

In the figures, the same technical elements are provided with the same reference signs, and are only described once. The figures are purely schematic, and, in particular, do not reflect the actual geometric proportions.

DETAILED DESCRIPTION

Figure 1:
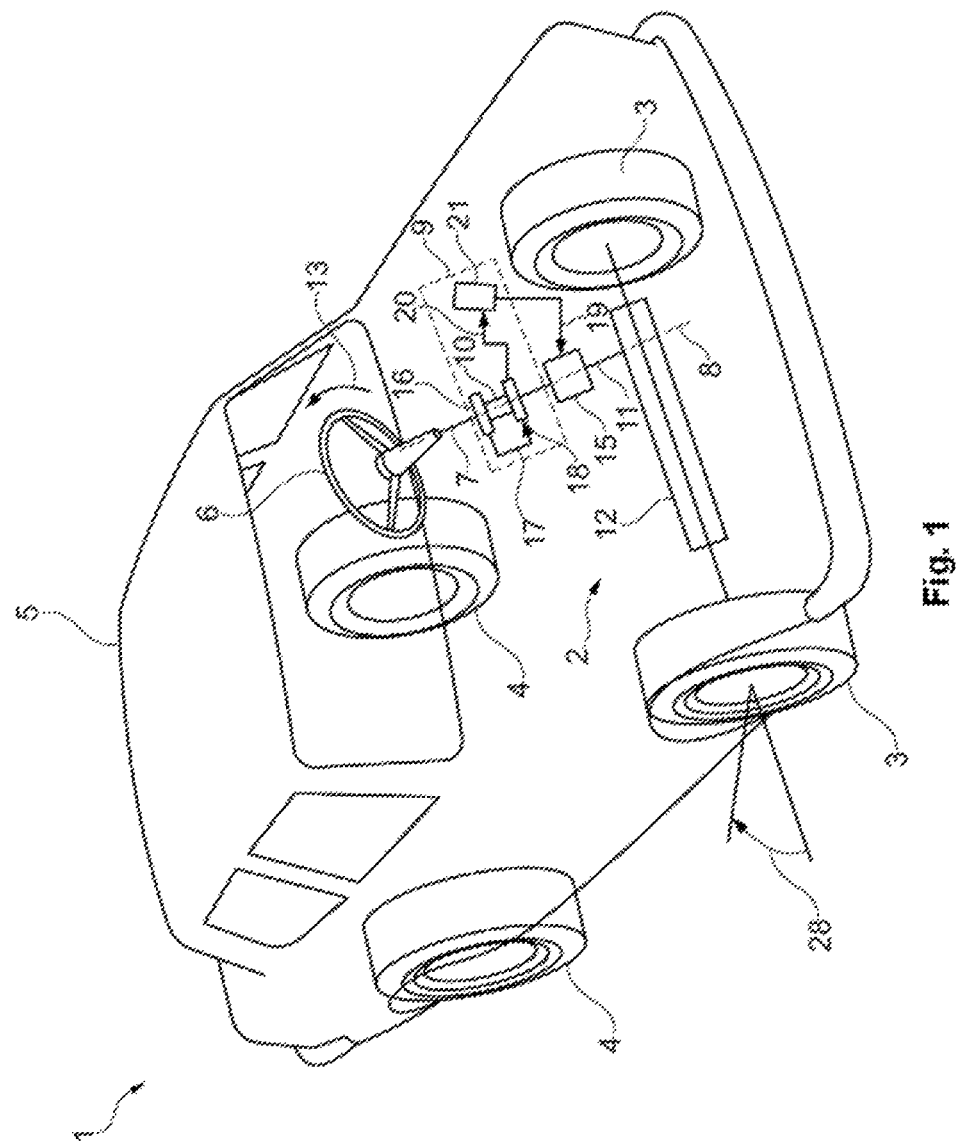
FIG. 1 schematic perspective view of a vehicle with a steering system.

Reference is made to FIG. 1, which is a schematic perspective view of a vehicle 1 with a steering system 2.

In the present exemplary embodiment, the vehicle 1 comprises a chassis 5 supported by two front wheels 3 and two rear wheels 4. The front wheels 3 can be turned by the steering system 4 so that the vehicle 1 can be driven in a curve.

The steering system 2 comprises a steering wheel 6 which is mounted on a first steering shaft 7 which in turn is mounted pivotably around a rotation axis 8. The first steering shaft 7 is guided in a torque sensor 9 and connected there to a torsion element 10 in a way not shown. A second steering shaft 11 is connected to this torsion element 10 on the side relative to the first steering shaft 7 on the rotation axis 8, and connected with a steering gear 12. If the steering wheel 6 is turned with a steering torque 13, the steering torque is transferred accordingly to the steering gear 12 which steers the front wheels 3 to drive in a curve with a wheel angle 14 as reaction to it.

The steering process may be supported by an auxiliary motor 15 which may assist the second steering shaft 11 in turning. For this purpose, the torque sensor 9 records the steering torque 13. The auxiliary motor 15 then steers the second steering shaft 11, among other things, in relation to the recorded steering torque 13.

To record the steering torque 13, the torque sensor 9 comprises a magnetic transducer element 16 which is connected to the first steering shaft 7 which induces a magnetic field 17. The steering torque sensor 13 also comprises a magnetic filter 18 which is connected with the second steering shaft 11, and which dampens the magnetic field 17 from the magnetic transducer element 16 in relation to a relative angular position 19 of the first steering shaft 7 and thus of the magnetic transducer element 16 to the second steering shaft 11 and thus to the magnetic filter 18, and transmits the dampened magnetic field 20 to at least one magnetic field sensor 21. This records the dampened magnetic field 20 and, based on this, generates the angular position 19 between the two shafts 7,11 or a signal depending on this. This angular position 19 or the depending signal is directly dependent on the steering torque 13 to be recorded, so that the auxiliary motor 15 can process this information immediately.

Figure 2B:
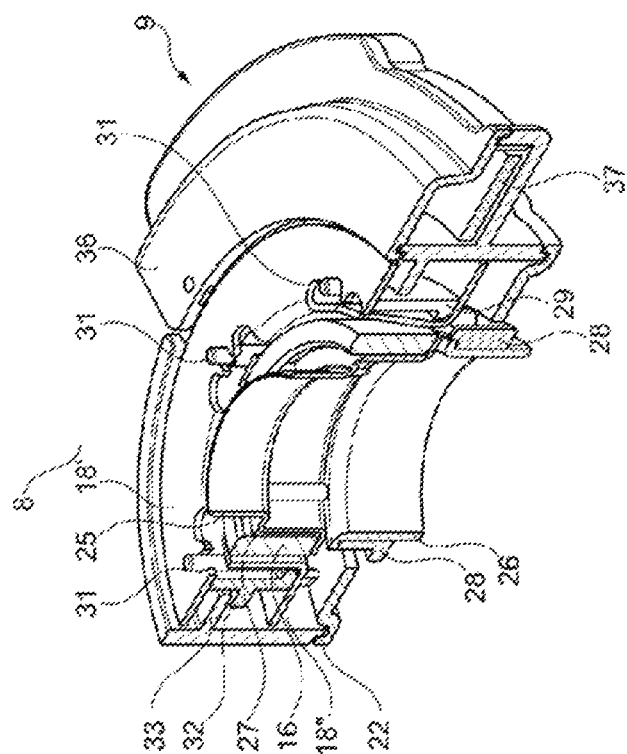
Figure 2A:
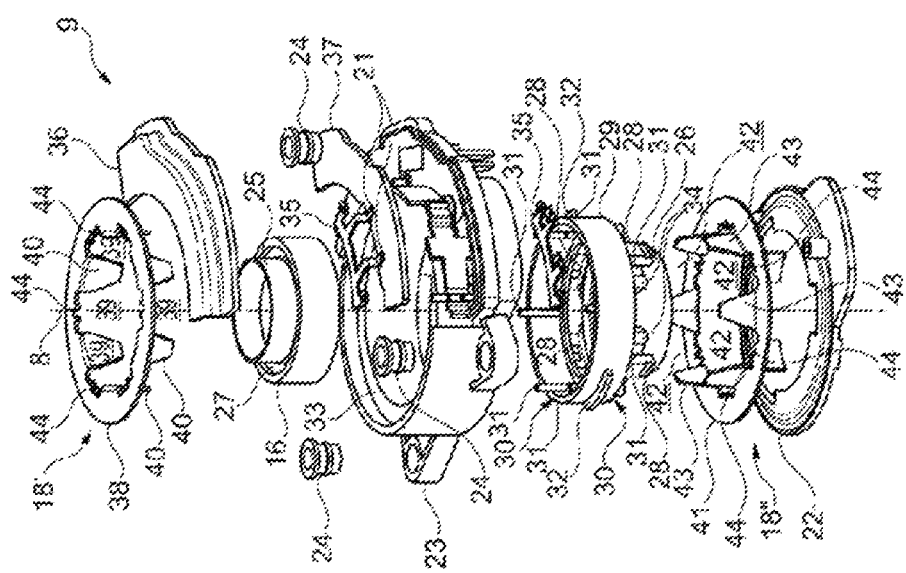
FIG. 2a an exploded view of a torque sensor for the steering system from FIG. 1.

In the following, the magnetic filter 18 is also referred to as stator 18 because it is a more common term for the torque sensor 9 to be described in the following in the FIGS. 2a and 2b.

The torque sensor 9 comprises a housing 23 around the rotation axis 8 which can be locked by a housing lid 22 which can be screwed to the vehicle 1 using protective elements 24. Aligned to the rotation axis 8, the housing 23 comprises a first bearing bush 25 for friction-locked attachment of the first steering shaft 7 and a second bearing bush 26 for friction-locked attachment of the second steering shaft 11.

The first bearing bush 25 is firmly fixed to the magnetic transducer element 16 by means of a fastener 27 such as a glue, so that the magnetic transducer element 16 is held firmly on the first steering shaft 7 when it is pressed into the first steering shaft 25.

The second bearing bush 26 is held firmly on clamping elements 28 of a coupling element 29, also referred to as carrier 29, which connects the stator 18 to the second bearing bush 26 in a way to be described later. For this purpose, the coupling element 29 essentially has the shape of a tube. Carrier fastening elements in the shape of spigots 31 project axially from the two front sides 30 of the coupling element 29, not all of which are marked with reference signs in FIG. 2a for reasons of clarity. These spigots 31 hold the stator 18 in a fixed position on the coupling element 29, which is described in more detail later. The coupling element 29 also has first axial supporting elements 32 on the sleeve side, onto which the coupling element 29 can be mounted axially on a support ring 33 of the housing 23. To mount the coupling element axially on the housing lid 22, two axial supporting elements 34 in the form of small feet are executed on the front side 30 of the coupling element 29 facing the housing lid 22.

If, during operation of the torque sensor 9, the first steering shaft 7 is turned, and the rotation is transferred to the second steering shaft 11 via the torsion element 10, the coupling element 29 guided on the support ring 33 and the housing lid 22 turn together with the stator 18 and the magnetic transducer element 16 in the housing 23. Due to inertia of the second steering shaft 11, the first steering shaft 7 can be twisted against the second steering shaft 11 when the first steering shaft 7 is turned. This causes the magnetic transducer element 16 and the stator 18 to also turn against each other. The torque sensor 9 basically works in such a way that it receives the magnetic field 17 from the magnetic transducer element 16 with the stator 18 depending on the turning angle, and transmits it to two magnetic field sensors 21 which are connected to the stator 18 via flux conducting elements 35. The flux conducting elements 35 are necessary because the magnetic field sensors 21 are arranged stationarily in the housing 23 on a circuit board 37 which can be covered with a lid 36, and must not turn during the steering process. Therefore, the flux conducting elements 35 are in frictional contact with the rotating stator 18, thus receiving the magnetic field 20 which is dampened by the stator 18, and transmit it to the stationary magnetic sensor 21.

The magnetic transducer element 16 comprises north and south poles (not shown) which are arranged alternately around the rotation axis 8 in circumferential direction. The stator 18 comprises two stator parts 18' and 18". The first stator part 18' comprises a stator ring 38 which extends evenly on an axial plane with the rotation axis 8. In a radial inner side of the first stator ring 38, first claws 40 being spaced from one another with first claw gaps 39 and at an axial distance from the first stator ring 38 extend in circumferential direction around the rotation axis 8. For reasons of clarity, not all of the first claw gaps 39 and the first claws 40 are marked with reference signs in FIG. 2a. The second stator part 18" comprises a stator ring 41 which extends evenly on an axial plane with the rotation axis 8 which is different from the axial plane, on which the first stator ring 38 extends. Along a radial inner side of the second stator ring 41, second claws 43 being spaced from one another with second claw gaps 42 and at an axial distance from the second stator ring 41 extend in circumferential direction around the rotation axis 8. For reasons of clarity, not all of the second claw gaps 42 and the second claws 43 are marked with reference signs in FIG. 2a. Each claw 40, 43 comprises a claw head 45 on its side opposite the respective stator ring 18', 18". For reasons of clarity, not all of these claw heads are marked with reference signs in the figures.

In the assembled condition, the two stator parts 18', 18" of the torque sensor are aligned with each other on the rotation axis 8, so that the first claws 40 engage axially in the second claw gaps 42, and the second claws 43 engage axially in the first claw gaps 39. The two stator parts 18', 18" are held on the spigots 31 of the coupling element 29 via stator fastening elements in the shape of yoke elements 44, so that they cannot be twisted against one another around the rotation axis 8 in circumferential direction. For reasons of clarity, not all of the yoke elements 44 are marked with reference signs in FIG. 2a.

In a zero position, when the first steering shaft 7 is not twisted relative to the second steering shaft 11, one of the two pole types of the magnetic transducer element 16 is opposed to the radial inner side of each first claw 40 of the stator part 18'—for example north poles. In contrast, in the zero position, the other pole type of the magnetic transducer element 16 is opposed the radial inner side of the second claw 43 of the second stator part 18"—for example south poles. The magnetic field 17 of the magnetic transducer element 16 thus engages almost fully in the first claws 40 on the first stator part 18' in the zero position, and is transmitted as hardly dampened magnetic field 20 through the magnetic field sensors 21 via the flux conducting elements 35.

If the two steering shafts 7, 11 are twisted relative to each other, however, the poles of the magnetic transducer element 16 are also displaced relative to the claws 40, 43 in circumferential direction, so that each claw 40, 43 is now covered radially both from the north poles and the south poles of the magnetic transducer element 16. In this condition, a part of the magnetic field 17 of the magnetic transducer element 16 is short-circuited on the claws 40, 43, so that a significantly dampened magnetic field 20 reaches the magnetic field sensors 21. The stronger the relative turning of the two steering shafts 7, 11, the more parts of the magnetic field 17 of the magnetic transducer element 16 are short-circuited on the claws 40, 43. This is why the dampened magnetic field 20 depends directly on the turning of the steering shafts 7, 11 to each other.

Figure 3C:
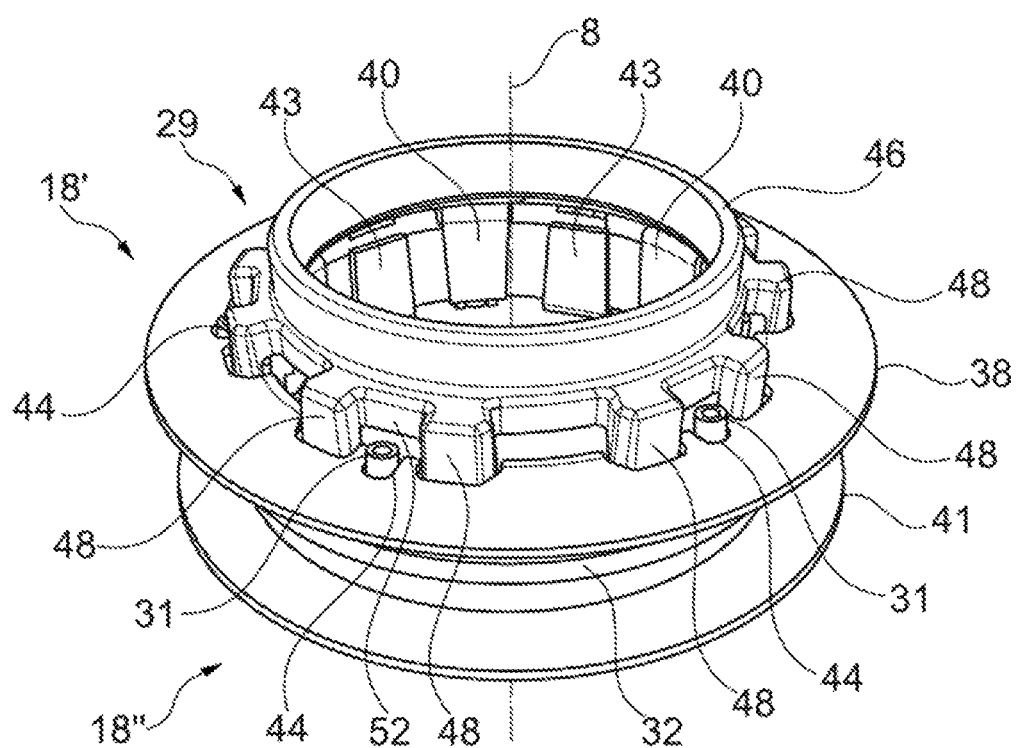

FIGS. 3a to 3c shall be used in the following to describe the fastening of the stator 18 to the coupling element 29 in more detail.

To fasten the stator 18 to the coupling element 29, the two stator rings 18', 18" are arranged co-axially on the rotation axis 8 and with the claws 40, 43 aligned with one another in such a way that when viewed in circumferential direction around the rotation axis 8, the first claws 40 on the first stator ring 18' point into the second claw gaps 42 of the second stator ring 18", and accordingly, the second claws 43 on the second stator ring 18" point into the first claw gaps 39 of the first stator ring 18'. The coupling element 29 is also arranged co-axially to the rotation axis 8 between the two stator rings 18', 18" in such a way that when viewed in circumferential direction around the rotation axis 8 the spigots 31 on the front sides 30 are aligned to the yoke elements 44 of the respective stator ring 18', 18" which is axially opposing the respective front side 30. This condition is shown in FIG. 3a.

Now the two stator rings 18', 18" are moved towards each other in such a way that the claws 40, 43 engage axially in the tube-shaped coupling element 29. In doing so, the yoke elements 44 are pushed axially above the spigots 31 until the stator rings 18', 18" touch down on the respective front side 30 of the coupling element 29. This condition is shown in FIG. 3b.

The individual spigots 31 are then stalked. To this end, the spigots 31 are heated on their axial end which projects from the respective front side 30, so that the material softens at this point. The softened material is now pressed against the stator rings 18', 18", so that it is distributed axially when viewed in the direction of the rotation axis 8. In this way, form closures are created between the stalked spigots 31 and the yoke elements 44 which act in an axial direction and hold the stator rings 18', 18" firmly on the coupling element 29.

To attach the first steering shaft 7 or the second steering shaft 11 to the coupling element 29, the latter has an attachment element in the form of a support ring 46, in which the corresponding steering shaft 7, 11 can be inserted axially. This support ring 46 can be connected with the steering shaft 7, 11 by press fitting.

The support ring 46 is held to one of the front sides 30 of the coupling element 29 via a number of columns 48 extending axially from the front side 30. Only some of these columns 48 are marked with their own reference signs in FIGS. 3a to 3c. These columns 48 are received in radial gaps 49 which extend radially outwards into the respective stator ring 18', 18" when viewed from the claws 40, 43. For reasons of clarity, not all of these radial gaps are marked with reference signs in the figures.

The columns 48 are arranged in such a way that, when viewed in circumferential direction around the rotation axis 8, they can always be inserted between a claw 40 of the stator ring 18' which rests on the front side 30 with the columns 48 and a yoke element 44 when assembled as described above. In order to guarantee optimum stability here, regardless of the direction in which the steering shafts 7, 11 are turned when the torque sensor 9 is in operation, the individual columns 48 have the same axial cross section. This is why a circumferential direction interval 50 between the abovementioned claws 40 and the yoke elements 44 is also constant, so that all of the yoke elements 44 lie in the centre of the radial gaps when viewed in circumferential direction. For reasons of clarity, not all of the individual circumferential intervals 50 are marked with reference signs in the figures.

To reinforce the mechanical strength, the columns 48 are combined with bridging elements 52 in the area of the yoke elements 44, which can be designed as one piece with the support ring 46. For reasons of clarity, not all of these bridging elements 52 are marked with reference signs in the figures.

Figure 4:
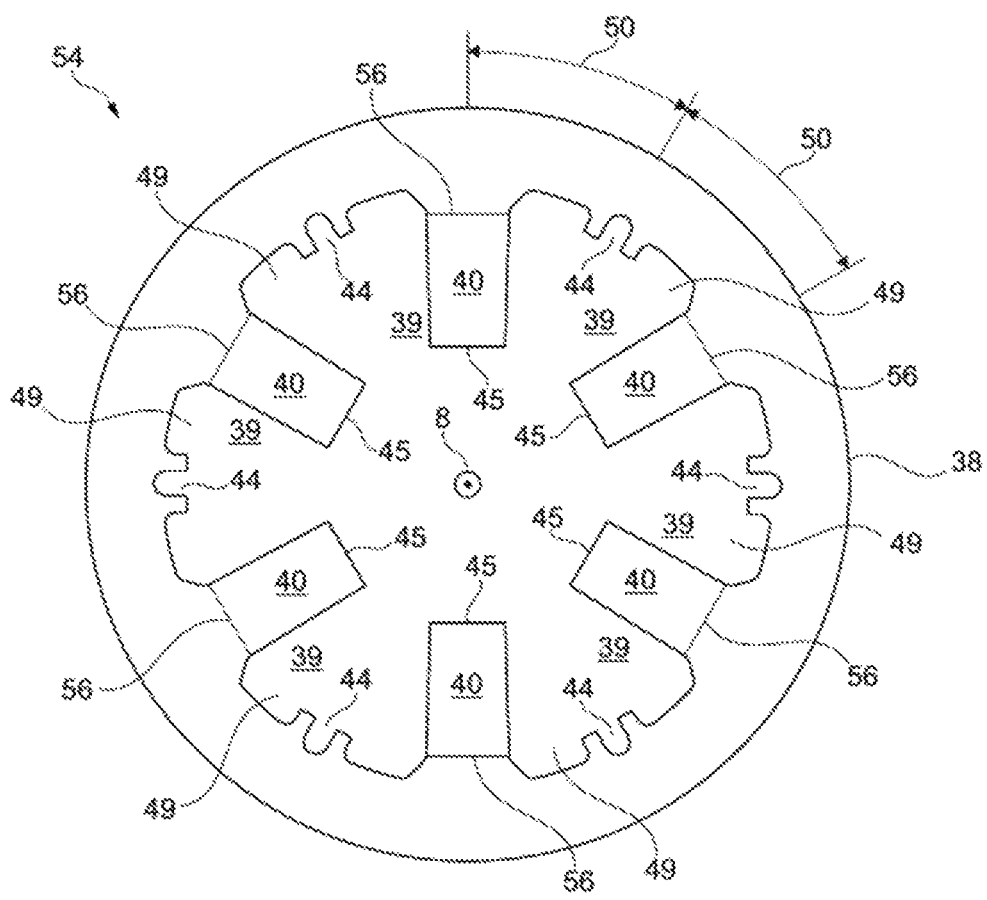
FIG. 4 illustrates a stator ring manufactured from a sheet of metal.

In conclusion, the production of the stator rings 18', 18" shall be described in more detail on the basis of the first stator ring 18' and FIG. 4.

First, the first stator ring 18' is cut from a sheet of metal as punched part 54. The punched part 54 already has the basic form of the first stator ring 18, except that the first claws 40 in the punched part 54 are radially bent inwards.

After punching, the first claws 40 are then bent axially along a respective bending line 56.

The invention claimed is:

1. A stator to guide a location-dependent magnetic field around a rotation axis in a circumferential direction, the stator comprising:
    a first stator ring rotating around the rotation axis, and
    a second stator ring disposed concentrically with the first stator ring and rotating around the rotation axis,
    wherein the first and second stator rings are arranged respectively on a first axial plane and on a second axial plane, the latter at a distance to the first axial plane, and executed circumferentially around the rotation axis, and
    wherein first claws projecting axially from the first stator ring in the direction of the second stator ring being arranged circumferentially around the rotation axis and at a distance with the first claw gaps engaging in second claw gaps between second claws which are arranged circumferentially around the rotation axis from the second stator ring, and protruding axially in the direction of the first stator ring at a distance to the second claw gaps,
    wherein each of the first and second claws comprises a claw head on the side axially opposing the stator ring, wherein
        in at least one of the first claw gaps and in one of the second claw gaps relative to the corresponding claw head engaging in the respective first and second claw gap, a stator fastening element is arranged on a carrier for fastening the first and second stator ring, the stator fastening element is a stator interlocking element that acts in circumferential direction, in which a carrier interlocking element arranged on the carrier may engage axially, and the stator interlocking element is a yoke radially pointing to the rotation axis.

2. The stator as claimed in claim 1, wherein the stator interlocking element can be executed as one piece with the respective stator ring.

3. The stator as claimed in claim 1, wherein the stator fastening element is arranged in a radial gap between two adjacent claws.

4. The stator as claimed in claim 3, wherein the stator fastening element is arranged in the centre of the radial gap between the two adjacent claws.

5. The stator as claimed in claim 1, wherein each stator ring is a punched part with the claws being bent axially.

6. A sensor to record a torque between a first shaft and a second shaft connected via a torsion bar, the sensor comprising:
   a cylindrical carrier with two opposing front sides, on which a carrier fastening element is arranged respectively,
   a stator fixed to the first shaft, whose stator rings are positioned on the front sides of the carrier and attached to the carrier via the respective carrier fastening element and a stator fastening element,
   a magnetic field transducer fixed to the second shaft, and arranged co-axially to the rotation axis to generate and feed the magnetic field into the stator, and
   a magnetic field sensor to record a magnetic field from the magnetic field transducer passing the stator,
   wherein the stator fastening element is a stator interlocking element that acts in circumferential direction, in which a carrier interlocking element arranged on the carrier may engage axially, and wherein the stator interlocking element is a yoke radially pointing to the rotation axis.

7. The sensor as claimed in claim 6, wherein the carrier fastening elements are spigots which are stalked with the stator fastening elements.

8. The sensor as claimed in claim 6, wherein connecting columns are positioned on one of the front sides of the carrier which carry an attachment element on the carrier for the first shaft.

* * * * *